March 17, 1953  F. O. CALVIN  2,631,492
INTERMITTENT FILM MOVING MECHANISM
Filed April 20, 1950
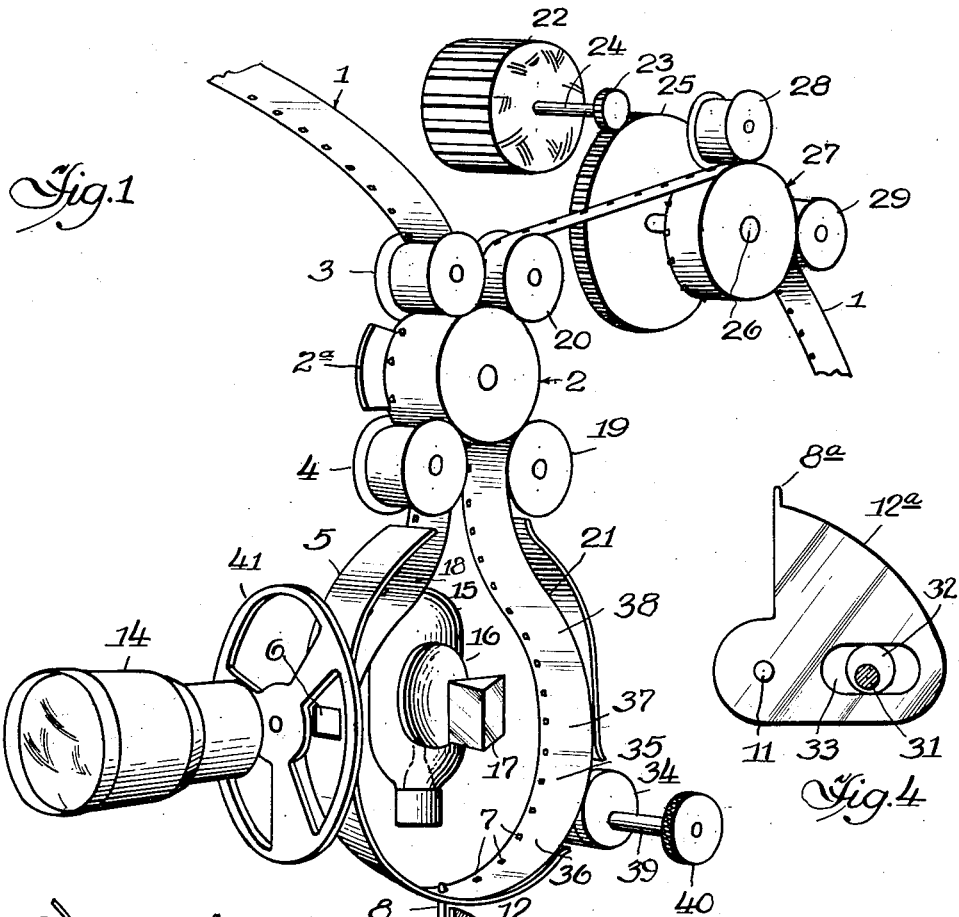
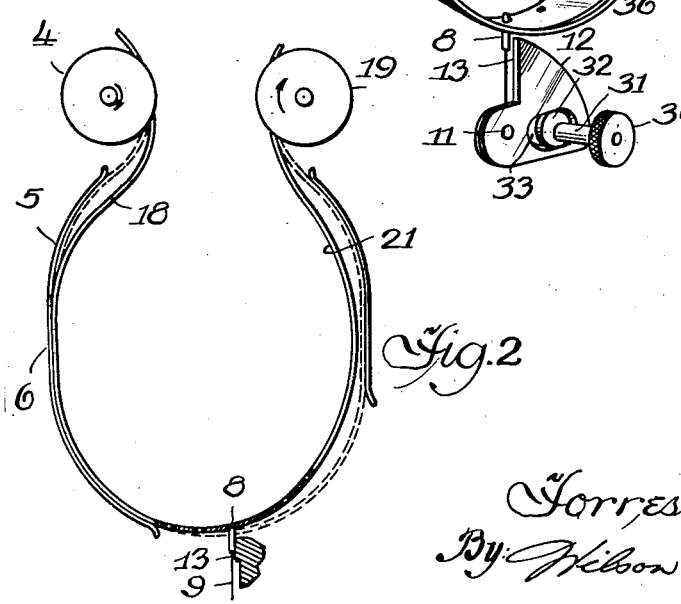
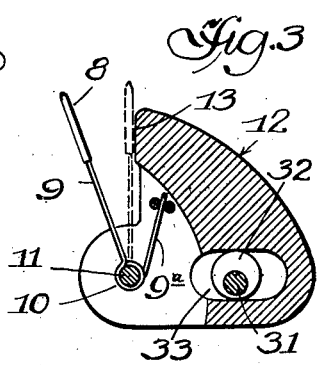
Inventor,
Forrest O. Calvin
By Wilson & Geppert Attys.

Patented Mar. 17, 1953

2,631,492

UNITED STATES PATENT OFFICE 2,631,492

INTERMITTENT FILM MOVING MECHANISM

Forrest O. Calvin, Leawood, Kans.

Application April 20, 1950, Serial No. 157,167

10 Claims. (Cl. 88—18)

The present invention relates to a novel means and manner of actuating a motion picture film intermittently past an aperture of either a projector, printer, camera, or the like.

Devices that have heretofore been utilized or proposed for moving film intermittently have been of the so-called claw or shuttle type or one using an intermittently rotating sprocket actuated by suitable mechanism such as a Geneva movement or the like. However, all such prior devices have the common objection and disadvantage of being comparatively expensive to manufacture and complicated to assemble in that they all require a multiplicity of complicated and precision manufactured parts.

A further objection and disadvantage of these prior types of mechanisms for intermittently moving film is that they require the film to be held under tension in a plane between two plates or guide members, commonly referred to as aperture or gate plates. This manner of retention of the film causes unnecessary and excessive wear on the film and makes the framing of the film rather complicated and expensive for the reason that either the plate containing the aperture, or the claw tooth or sprocket teeth, must be moved relative to the film and the optical center line of the device by means of springs, levers, movable cams, pivots or the like.

Yet another objection and disadvantage of the above mentioned prior types of intermittent film moving mechanism is the amount of noise and the lack of steadiness of the picture resulting from or inherent in the use of such mechanism when running films of various ranges of shrinkages or shrink characteristics.

A still further objection and disadvantage of these conventional intermittent mechanisms or those heretofore employed lies in the fact that substantially all use the same or top edge of the sprocket hole of the film in pulling it down cyclically into its proper framed position. Thus, after a number of projections of a film in various types or models of prior equipment and frequently by poor or inexperienced operators or projectionists, the film is often worn or damaged even to the extent of "key-holing" or total destruction or tear out of these conventionally used top edges of the sprocket holes.

It is, therefore, an important object of the present invention to provide a novel means and mechanism for intermittently moving motion picture film past an aperture in a projector, printer, camera and the like, in such manner as to obviate or eliminate the above objections and the inherent disadvantages of such prior types of devices.

Another object of the present invention is the provision of a novel intermittent film moving mechanism in which the number, precision and complexity of component parts required for its construction and operation is reduced to a minimum, thereby making it inexpensive and simple to manufacture, assemble or disassemble as well as to operate, and making it particularly adaptable for use in low cost and simple devices employing either 8 or 16 millimeter film of the type ordinarily used in homes, libraries and schools for editing and projecting.

A further object of the present invention is the provision of a novel device for the intermittent movement of film and making it possible to satisfactorily project film in which the sprocket holes have become worn or damaged due to repeated projection in prior types of film moving mechanism. This is made feasible by the present invention in that it utilizes for its film registration the bottom rather than the top edges of the sprocket holes.

The present invention further comprehends the provision of a novel intermittent film moving unit or mechanism that is capable of effective operation at extremely high speeds, and thus readily lends itself to speeds required or desired in the operation of the printing or copying machines for the economical production of prints or copies of motion picture film where the high speed intermittent movement of two films together in the exact, registering close contact is required.

Another object of the present invention is the elimination of one of the guides or plates with its accompanying means of holding the film under tension required in the prior devices, and thus eliminating unnecessary wear on the film incident to such use.

Yet another object of the present invention is the elimination of the complicated and expensive framing mechanism required in or essential to the operation of the intermittent devices now in commercial use.

A still further object of the present invention is to provide a highly simplified and positive control over the film steadiness and noise problems commonly caused by various ranges of film shrinkage.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawing:

Figure 1 is a view in perspective of the present invention embodied in a motion picture projector and its relationship with the projection assembly.

Fig. 2 is a fragmentary view in side elevation and showing diagrammatically the arrangement of the loops and the manner of intermittently feeding the film past the aperture of the projector.

Fig. 3 is an enlarged view, part in side elevation and part in vertical cross-section of the framing assembly, including the shock absorbing pin for engaging in the sprocket holes of the film and moving therewith, and the stop or abutment against which the pin engages when it reaches the limit of its movement as shown in dotted lines.

Fig. 4 is a view in side elevation of an alternate construction of framing lever having a shock absorbing pin affixed thereto.

Referring more particularly to the disclosure in the drawing and to the novel illustrative embodiment wherein the present invention is shown embodied in a motion picture projector, the film 1 to be projected or viewed before entering the intermittent feeding and control mechanism passes over or around one side of a sprocket 2 and over a pair of spaced rollers 3 and 4 disposed above and below the sprocket 2 for holding the film against the sprocket. If desired, any suitable guide means or locking guards 2ª between the rollers 3 and 4 may be additionally provided for holding the film 1 firmly upon the sprocket 2.

The film in leaving the lower roller 4 is forced by its own stiffness downwardly and against an aperture plate or restraining guide 5 provided with a suitable projection aperture 6. As this film slides down adjacent to and over the rear surface of the guide 5, one of the spaced sprocket holes 7 in the film is engaged by a movable spring-mounted shock absorbing pin 8 disposed adjacent the lower end of the loop film 1. This spring-mounted pin 8 is shown more clearly in Fig. 3 and is preferably mounted upon one end 9 of a coil spring 10 encompassing a transverse mounting pin 11 upon which is pivotally mounted a framing lever 12 provided with a stop or abutment 13. In order to maintain the spring under tension, the other end 9ª thereof may be anchored within a slot provided in the framing lever 12. This shock absorbing pin 8 upon engaging a sprocket hole 7 moves with the film and gradually decelerates it until brought to a complete stop by engagement of the pin 8 against the stop or abutment 13 on the framing lever 12.

At the instant the pin 8 engages the stop 13, the section of film lying between the roller 4 and the pin 8 is maintained in a fixed position adjacent to the restraining guide 5 and against the aperture 6. The distance between the aperture 6 in the guide 5 and the pin 8 when engaging the stop 13 is such that when the shock absorbing pin 8 is at rest against the stop, a frame of the film lies against the aperture 6 in correct position for projection or viewing through the aperture by means of the lens apparatus 14. Light for viewing the film may be projected through it by any conventional light source 15 and condensing light system 16 by means of a prism or mirror 17.

As the projection proceeds, the sprocket 2 continues to feed film into the system forming a slack loop at approximately the position shown by the reference numeral 18, and simultaneously therewith the other side of the sprocket 2, upon which the outgoing portion of the film is engaged by a pair of rollers 19 and 20 in a manner similar to the engagement of the rollers 3 and 4, with the other side of the sprocket 2, is shortening the film loop 21 between the shock absorbing pin 8 and the roller 19.

When the loop 18 has grown sufficiently large to force the film away from the aperture 6 and thus out of focus, the second loop 21 becomes sufficiently short to pull the sprocket hole 7 out of engagement with the shock absorbing pin 8. At this instant the then disengaged pin 8 actuated by the spring 10 upon which it is mounted moves forwardly or in counter-direction to the motion of the incoming film which is being impelled toward it and into the loop 21 by the stiffness of the film in the slack loop 18. As the next adjacent sprocket hole in the moving film is then engaged by the shock absorbing pin 8, the film is again decelerated to a stop upon this pin engaging or contacting the stop or abutment 13, thus placing the next adjacent frame in alignment with and against the aperture 6 in fixed position for projection or viewing, whereupon the sprocket 2 continues to pull the film from the loop 21 until the sprocket hole with which the shock absorbing pin 8 was in engagement again becomes disengaged. Thus the intermittent cycle continuously repeats itself at a rate determined by the rotational speed of the sprocket 2.

In the illustrative embodiment of Fig. 1, there is shown one form of drive mechanism for feeding the film over the sprocket 2 and past the aperture 6, including a motor 22 having a drive pinion or gear 23 keyed or suitably fixed to the outer end of the motor shaft 24. This pinion or gear 23 is in continuous meshing and driving engagement with a relatively large pinion or gear 25 fixed to one end of and driving a stub shaft 26 to the other end of which shaft is fixed or secured a sprocket 27. Suitably mounted and freely rotatable rollers 28 and 29 maintain the outgoing film 1 upon the sprocket 27 whereby the sprocket 2 may be free-rolling and driven solely by the pull upon the film as it leaves the intermittent device, although any frictional means or the like for braking the free-rolling motion of the sprocket may be provided. Or, if desired, the sprocket 2 may be directly driven. Such an application may be where a sound track scanning device is used in association with the present intermittent mechanism, in which event it may be necessary or desirable to drive the sprocket 2 by positive means associated with the sound scanning device and other parts of the apparatus.

In the disclosed embodiment of the present invention, framing is preferably accomplished as necessary by rotation of a knob 30 secured to the outer end of a stub shaft 31, to the other end of which shaft is fixedly secured an eccentric framing cam 32 acting or operating in an elongated and elliptical-shaped slot 33 in the framing lever 12. Thus the cam 32 by reason of its adjustment in the slot 33 moves the framing lever 12 angularly about its mounting pin or pivotal axis 11 thereby to vary the longitudinal position of the stop 13 against which the shock absorbing pin 8 abuts, whereby to vary the length of film between the pin 8 and the aperture 6 and thereby providing suitable framing control for a wide variation in film shrinkages.

Another important advantage of this method of framing is that it eliminates any necessity for moving the aperture or an aperture or gate plate vertically with respect to the film and the optical center line of the device, thus permitting the picture to be framed without moving the aperture or its image upon the viewing screen. Thus there is provided a simple and inexpensive means and manner of framing without the necessity of using complex and expensive precision parts usually required in prior types and method of framing, and this present method of framing also allows a greater concentration of light upon the aperture.

Another troublesome result of varying film shrinkages is the noise created by the action of the films in handling devices which are ordinarily designed to effectively handle film of only one particular shrinkage. In the present invention all the objectionable noise which would tend to be created by the sudden deceleration at the shock absorbing pin 8, and the snapping action of the film itself as it comes to a stop in the loop 21 after being fed into this loop by the stiffness of the slack loop 18, is effectively eliminated.

Noise which might be caused by deceleration at the shock absorbing pin 8, is eliminated by the action and stiffness of the spring 10 upon which the shock absorbing pin is mounted. However, if the range of shrinkages encountered is small or if a certain amount of noise is not objectionable, it may be found unnecessary to spring mount the pin 8. Fig. 4 discloses such an alternate embodiment in which the shock absorbing pin 8ª is formed integral with the framing lever 12ª rather than spring-mounted as in Fig. 3.

Any noise due to the snapping action of the film itself as it enters the loop 21 and comes to a stop is eliminated by suitable placement of an eccentric roller 34 so positioned as to contact the film transversely at 35 just as it comes to a stop and serving at that instant to guide the film into relatively slight elastic loops at approximately the positions noted by the reference numerals 36, 37 and 38 in the over-all loop 21. The energy of the moving film is thus absorbed by longitudinal deceleration in forming these relatively slight loops, and the tendency of any snapping action and noise are eliminated.

As film shrinkages vary, the total length of the loop 21 changes (1) because of the necessity of moving the stop position of the shock absorbing pin 8 for framing and (2) because of shrinkage in the loop itself. Since for maximum noise control the correct formation of the small elastic loops 36, 37 and 38 is rather critical, it is important that the position of the line or point of contact 35 of the eccentric roller 34 be made adjustable so as to contact the film correctly as varying shrinkages are encountered. Such adjustment is preferably accomplished by making the shrinkage control noise eliminator roller 34 eccentric and mounting it upon a rotatable shaft 39 provided with a control handle 40 at the outer end in a position for ready adjustment.

Thus in the operation of the present novel mechanism, film of any shrinkage characteristics may be most effectively handled and with optimum results by simply adjusting the framing knob 30 and the shrinkage control noise eliminator knob 40, depending on the shrinkage encountered in the film being exhibited or viewed.

In the event the light flux is sufficiently great or the projection standard of a particular utilization sufficiently high as to render means necessary for control of travel ghost or flicker, a shutter 41 may be provided and positioned as shown in Fig. 1 or at such other suitable location in the light beam whereby to effectively provide this control.

Having thus disclosed the invention, I claim:

1. Mechanism for moving motion picture film intermittently past an aperture of a projector, camera, printer and the like, comprising a curved guide member having an aperture, means disposed above said guide member for feeding film from one side of a depending loop downwardly over the curved guide member to and past the aperture and means for withdrawing film from the other side of the loop, and means for framing the film and including a pivotally mounted shock absorbing pin mounted adjacent the base of the loop intermediate the feeding and withdrawing means and adapted to be received in a sprocket hole of and movable with the film thereat for decelerating the travel of the film, said guide member and its aperture being located between the film being fed to the loop and the pin, and a stop against which the pin engages at the limit of its movement, whereby the film is moved intermittently past the aperture and momentarily framed when the pin engages the stop, the distance between the aperture and the pin being such that when the pin rests against its stop a frame of the film lies against the aperture for projection, and as the feeding means continues to feed film a slack loop is formed between the feeding means and the aperture and simultaneously the withdrawing means shortens the loop between it and the pin, and when the slack loop increases sufficiently to force the film away from the aperture the loop between the pin and the withdrawing means becomes sufficiently short to pull the sprocket hole engaged by the pin out of such engagement, whereupon the pin is moved away from the stop and engages the next sprocket hole to place the next frame in alignment with the aperture when the pin engages the stop.

2. Mechanism for moving motion picture film intermittently past an aperture of a projector, camera, printer and the like, comprising a curved guide member having an aperture, means arranged above said guide member for feeding film from one side of a depending loop over the guide member to and past the aperture and for withdrawing film from the other side of the loop, and a framing device having a shock absorbing pin disposed between the film feeding and withdrawing means and adapted to be received in a sprocket hole of the film with the guide member and aperture located between the film being fed to the loop and the pin, said pin being movable through a predetermined arc of travel during each framing of a picture and maintaining a frame of the film against the aperture in correct position for projection or viewing, the distance between the aperture and the pin being such that when the pin is moved to a predetermined position a frame of the film lies against the aperture for projection, and as the feeding means continues to feed film a slack loop is formed between the feeding means and the aperture and simultaneously the withdrawing means shortens the loop between it and the pin, and when the slack loop increases sufficiently to force the film away from the aperture the loop between the pin and the withdrawing means becomes sufficiently short to pull the sprocket hole engaged by the pin out of such engagement, whereupon the pin engages the next sprocket hole to place the next frame in alignment with the aperture.

3. Mechanism for moving motion picture film intermittently past an aperture of a device such as a projector, camera, printer and the like, comprising means disposed above and continuously feeding film to said device in the form of a depending loop and for withdrawing film therefrom, guide means defining the loop and including a curved guide member having an aperture past which one side of the loop of film is moved, an adjustably mounted framing lever disposed below and spaced from the guide member and in the path of the film leaving the aperture for framing the film against the aperture of said member, a shock absorbing pin pivotally mounted on the framing lever adjacent the bottom of the loop and adapted to be received within a sprocket hole in the film and movable therewith for decelerating the travel of the film, and an abutment on the framing lever placed in the path of the pin and when engaged by the pin properly frames the film against the aperture, the distance between the aperture and the pin being such that when the pin rests against its stop a frame of the film lies against the aperture for projection.

4. In a device for projecting or viewing motion picture film, comprising a curved guide plate provided with an aperture, a sprocket disposed above and spaced from the guide plate for continuously feeding film into and for withdrawing film from the device in the form of a depending loop, and means for intermittently moving the film past the aperture and including framing mechanism disposed at the base of the loop having a spring-mounted shock absorbing pin disposed in the path of the film leaving the aperture and adapted to engage a sprocket hole in the film and movable with the film against the tension of the spring whereby to decelerate the movement of the film, and a stop on the framing mechanism against which the pin engages and momentarily holds the frame in fixed position against the aperture for projection or viewing, the distance between the aperture and the pin being such that when the pin rests against its stop a frame of the film lies against the aperture for projection, and as the feeding means continues to feed film a slack loop is formed between the feeding means and the aperture and simultaneously the withdrawing means shortens the loop between it and the pin.

5. In a motion picture projector, camera, printer or similar device having an apertured, curved plate past which a film is moved, means disposed above and spaced from the aperture of the plate for continuously feeding film to and withdrawing film from said device, and means for intermittently moving one side of a depending loop of film past the aperture in the plate, said film being forced by its own stiffness downwardly against the apertured plate, a spring-mounted shock absorbing pin disposed adjacent the bottom of the loop and in the path of the film leaving the apertured plate, said pin being movable through a predetermined arc of movement and adapted to engage in a sprocket hole in the film and movable with the film, and a limiting stop against which the pin abuts to momentarily position a frame of the film against the aperture, the distance between the aperture and the pin being such that when the pin rests against its stop a frame of the film lies against the aperture for projection, and as the feeding means continues to feed film a slack loop is formed between the feeding means and the aperture and simultaneously the withdrawing means shortens the loop between it and the pin, and when the slack loop increases sufficiently to force the film away from the aperture the loop between the pin and the withdrawing means becomes sufficiently short to pull the sprocket hole engaged by the pin out of such engagement, whereupon the pin is moved away from the stop and engages the next sprocket hole to place the next frame in alignment with the aperture when the pin engages the stop.

6. Mechanism for moving picture film intermittently past an aperture of a projector, camera, printer and the like, comprising means disposed above and spaced from the aperture for feeding film to and past the aperture and withdrawing it therefrom in the form of a depending loop, means for defining the loop including a curved guide plate provided with the aperture, and means for framing the film and including a pivotally mounted shock absorbing pin located below the aperture adjacent the bottom of the loop and intermediate the film feeding and withdrawing means and disposed in the path of the film leaving the guide plate, said pin being adapted to be received in a sprocket hole of and movable with the film for decelerating the travel of the film, a stop against which the pin engages at the limit of its movement whereby the film is moved intermittently past the aperture and momentarily framed when the pin engages the stop, and means for varying the position of the stop whereby to vary the length of film between the aperture and the pin for controlling the frame of wide variations of film shrinkages.

7. Mechanism for moving motion picture film intermittently past an aperture of a projector, camera, printer and the like, comprising means disposed above and spaced from the aperture for feeding and taking up the film to and past the aperture in the form of a depending loop, means for defining the loop including a curved guide plate bearing the aperture against which the film is fed, a framing lever disposed in the path of the film leaving the aperture and adjacent the bottom of the loop between the film feeding and the taking up means, a shoulder on said lever providing a stop, a spring-mounted pin carried by said lever and adapted to be received in a sprocket hole of the film, said pin being located beyond the aperture and movable through a predetermined arc of travel during each framing of a picture and maintaining a frame of the film against the aperture in correct position for projection or viewing when the pin engages the stop, and cam-actuated control means for moving the framing lever to vary the position of the stop and thereby controlling the framing of wide variations of film shrinkages.

8. Mechanism for moving motion pitcure film intermittently past an aperture in a projector, camera, printer or similar device, comprising a sprocket having a feed and take-up side for continuously feeding film to the device in the form of a depending loop, a curved apertured guide plate over which the film is fed and spaced from the feed side of the sprocket, a framing device adjacent the bottom of the loop and spaced from the aperture for placing successive frames against the aperture of the plate for projection or viewing and including a stop and a movable, spring-mounted pin positioned beyond the film leaving the aperture engaging in successive sprocket holes of the film for decelerating the motion of the film and engaging the stop when the film is framed against the aperture, and means in combination with said apertured plate, sprocket and framing device defining and forming loops of film between the feed side of the sprocket and aperture and between the framing device and take-up side of the sprocket whereby when the loop between the feed side of the sprocket and the aperture is sufficiently large to force the film away from the aperture, the loop between the framing device and the take-up side of the sprocket is shortened to such an extent as to pull the film and the sprocket hole engaged by the pin out of such engagement to thereby release the pin and permit it to move forwardly by its spring mounting contrary to the motion of the film which is impelled toward it and into the loop between the framing device and the take-up side of the sprocket by the film stiffness of the loop between the feed side of the sprocket and the aperture.

9. In a motion picture projector, camera, printer or similar device having a curved guide plate having an aperture past which a film is moved, a sprocket spaced from the aperture for continuously feeding film to said device and for withdrawing film therefrom, and means for intermittently moving the film past the aperture in the plate with said film being forced by its own stiffness downwardly against the apertured plate, said means including a spring-mounted shock absorbing pin disposed beyond and in the path of the film as it leaves the apertured plate and between the film feeding and withdrawing side of the sprocket and movable through a predetermined arc of movement to engage in a sprocket hole in the film and movable with the film, a limiting stop against which the pin abuts to momentarily position a frame of the film against the aperture, said film in passing through the device being formed as depending elastic loops between the film feeding side of the sprocket and the aperture and between the pin and the film withdrawing side of the sprocket, and an eccentric roller engaging the film between the pin and sprocket as the film is being withdrawn and so positioned as to contact the film as it comes to a stop, thereby absorbing the energy of the moving film by longitudinal deceleration in forming a plurality of relatively small loops and eliminating any snapping action and noise resulting from the operation.

10. In a device for projecting or viewing motion picture film, comprising a curved guide plate having an aperture, a sprocket for continuously feeding film into the device and for withdrawing film therefrom, and means for intermittently moving the film past the aperture of the plate and including framing mechanism between the film feeding and film withdrawing side of the sprocket including a spring-mounted shock absorbing pin, said pin being disposed beyond and in the path of the film leaving the aperture plate and adapted to engage a sprocket hole in the film and movable with the film against the tension of the spring whereby to decelerate the movement of the film, a stop on the framing mechanism against which the pin engages and momentarily holds the frame in fixed position against the aperture for projection or viewing, said film in passing through the device being formed as depending elastic loops between the film feeding side of the sprocket and the aperture and between the pin and the film withdrawing side of the sprocket, an eccentric roller for controlling the framing of film of varying shrinkage characteristics and the noise resulting from the intermittent operation, said roller engaging the film between the pin and the film withdrawing side of the sprocket and so positioned as to contact the film as it comes to a stop, thereby absorbing the energy of the moving film by longitudinal deceleration in forming a plurality of relatively small loops and eliminating any snapping action and noise resulting from the operation, and means for controlling the adjustment of the roller.

FORREST O. CALVIN.

REFERENCES CITED

The following references are of record in the file of this patent:

UNITED STATES PATENTS

| Number | Name | Date |
| --- | --- | --- |
| 1,244,920 | Thomas | Oct. 30, 1917 |
| 1,874,908 | Braig et al. | Aug. 30, 1932 |
| 1,898,850 | Papo et al. | Feb. 21, 1933 |